Sept. 27, 1966 P. S. HOFFMAN ETAL 3,275,914
ELECTRIC CAPACITOR HAVING DIELECTRIC SPACER OF
RECONSTITUTED MICA INTERLEAVED
WITH SOLID PLASTIC
Filed Sept. 19, 1963
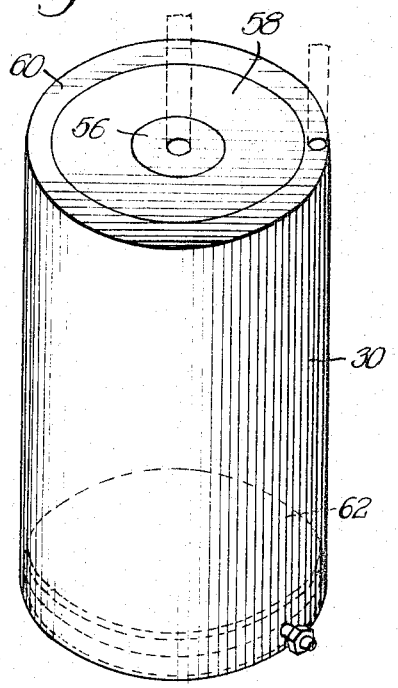
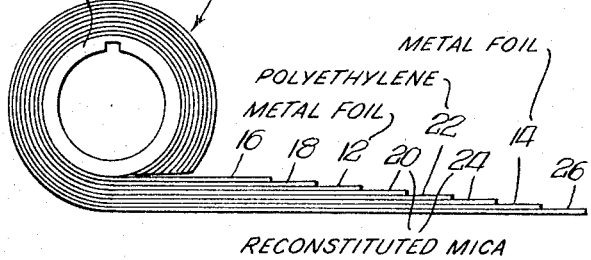
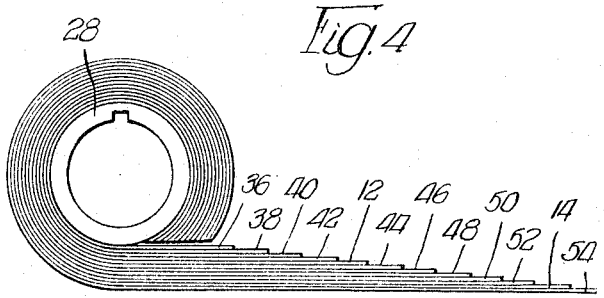
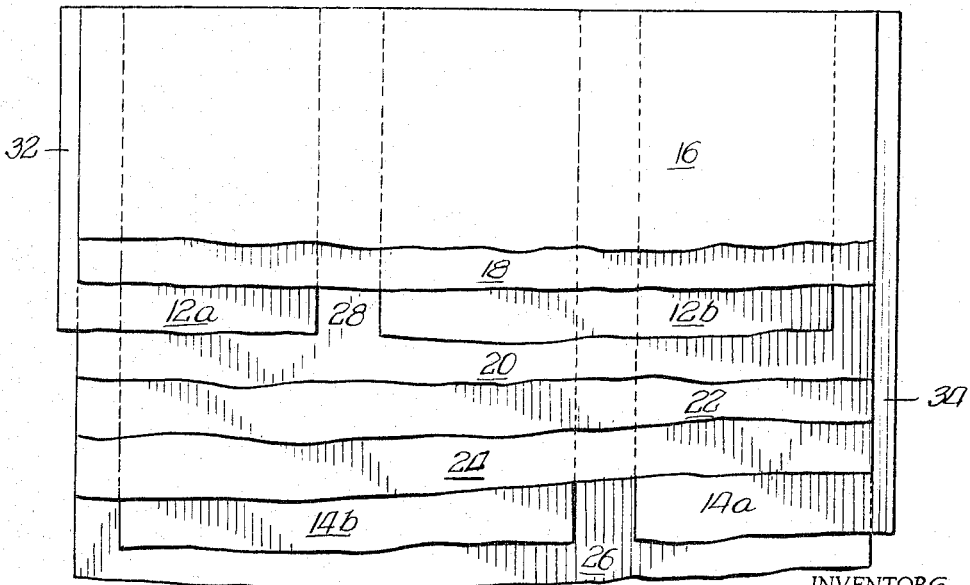
INVENTORS.
Paul S. Hoffman,
William M. King,
BY
Brown Jackson Boettcher + Dienner
ATTYS 3,275,914
ELECTRIC CAPACITOR HAVING DIELECTRIC SPACER OF RECONSTITUTED MICA INTERLEAVED WITH SOLID PLASTIC
Paul S. Hoffman and William M. King, Springfield, Ill., assignors to Sangamo Electric Company, Springfield, Ill., a corporation of Delaware
Filed Sept. 19, 1963, Ser. No. 309,993
2 Claims. (Cl. 317—258)

This invention relates to energy discharge capacitors intended for use in high Q ringing discharge applications and includes a novel and improved dielectric therefor.

A principal object of the invention is to provide such a capacitor which will be useful in high voltage high frequency applications and will be sufficiently rugged and otherwise resistant to physical or chemical change so as to have a long life. For example, it is contemplated that capacitors in accordance with the invention will have a capacitance in the order of one or two microfarads at operating voltage of at least 5,000 and preferably up to and in excess of 60,000 volts through a frequency range between 30 and 100 kilocycles with a Q in the order of 600 for said frequencies.

One of the major causes of capacitor breakdown at said voltage and ringing frequencies is corona damage in the dielectric. It is a feature of this invention that the capacitor comprises cooperating armatures in the form of several series sections of low resistance or electrically conductive metal foils such as aluminum, copper, tantalum, lead and the like interleaved with a dielectric spacer sheet or lamina, both the foils and the dielectric spacer having sufficient strength and stress resistance as to be mechanically adapted to conform to a round arbor about which the foils and interleaved dielectric are wound. The capacitor being wound tightly on a true round or cylindrical arbor as opposed to one of oval cross section, eliminates sharp folds in the dielectric material which contribute to corona damage in capacitors operating at said high voltage levels.

A further feature of the invention is the selection of a dielectric which will have an exceedingly high voltage breakdown at the desired ringing discharge frequencies.

Conventionally used kraft paper tissue is unsatisfactory because of its low Q values at high frequencies. Other materials such as mica and various plastics used in the past as a dielectric spacer are also unsatisfactory either because they lack sufficient flexibility, have a relatively low Q at said high voltage operating levels and frequencies and/or are difficult to thoroughly impregnate so as to avoid voids which are a further source of corona damage.

It was discovered, however, that thin sheets of a porous material such as reconstituted mica of which Samica is an example, when interleaved with polyethylene and so arranged that the reconstituted mica lies between the conductive foils and the polyethylene and the assembly thoroughly impregnated with a high voltage corona resistant fluid, as for example, castor oil, produce a highly satisfactory dielectric and afford a capacitor of surprisingly high Q at the desired ringing frequencies and one of exceedingly long life by comparison with wound capacitors where the foil armatures are spaced by paper and/or solid dielectric plastics. The polyethylene provides mechanical strength for holding the thicknesses of reconstituted mica in the manufacturing process as well as being a material of good dielectric strength and having very high Q. The reconstituted mica being porous provides a webbing about the polyethylene and foil which accommodates a thorough impregnation of the wound assembly with the corona inhibiting dielectric fluid. The reconstituted mica thicknesses by reason of their proximity to the foils and location therebetween and the solid polyethylene film acts as a wick to both draw and hold the impregnating oil in the vicinity of the armature foils and film surfaces. The polyethylene has sufficient temperature resistance to permit thorough drying of the reconstituted mica webbing while contributing high volume resistivtiy and high Q to the complex. The castor oil is compatible with both and retains its function in high frequency high voltage discharge applications below temperatures of 45° C. Reconstituted mica, unlike ordinary sheet mica, is conventionally available in roll form, sheets thereof having a thinckness from 0.0015 to 0.005 inch, and are described as comprising flake Muscovite mica which has been partially dehydrated by heat, treated with sodium carbonate or bicarbonate solution and then with sulphuric acid, and after washing, formed into continuous sheets on a Fourdrinier-type machine. This form of mica is highly porous, has a dielectric strength of 500–800 volts/mil, a dielectric constant comparable to mica, and a high Q. In addition, it is radiant resistant which means that capacitors employing it as a dielectric can be used around fusion experiments where radiation is present.

Thus it is a feature of capacitor according to the invention, that their cooperating armatures or foils are separated by a dielectric complex strata, layer or thickness in which a porous material having a high dielectric constant is combined with a solid film which, although of much lower dielectric strength, has a high breakdown voltage, the complex being impregnated with a high dielectric fluid which completely fills all voids between the foils. It is this dielectric complex which is believed to give capacitors comprising the present invention their outstanding characteristics of low power loss and high Q at the indicated operating voltage levels and discharge frequencies.

The dielectric complex of choice is the mentioned reconstructed mica such as Samica interleaved with polyethylene and impregnated with castor oil. However, polypropylene or Teflon (polytetrafluoro ethylene) may replace the polyethylene or be used in the dielectric complex as an additional solid dielectric film or layer. Although Teflon has excellent Q at the indicated high frequencies and operating voltages, it has poor corona resistance and minute pinholes are apparent in thin films thereof. Thorough impregnation thereof with the dielectric oil largely overcomes this drawback and it is particularly useful as the solid component of the dielectric complex in capacitors which are used at frequencies below the corona threshold of the Teflon. Polyethylene itself has poor temperature resistance. However, when cross-linked by high-energy radiation all its favorable mechanical properties are retained while its softening range is considerably raised. Irradiated polyethylene has a tensile strength of 1800 to 2200 p.s.i., a specific gravity of .92 and does not melt at temperatures as high as 175° C., although above 105°–115° C. it changes from a plastic to an elastic material. It is highly resistant to environmental stress cracking while including the toughness, flexibility necessary for tight winding, and has a dielectric constant of 2.3 and a dielectric strength of 2,000 to 2,500 volts per mil at power frequencies. Therefore, irradiated polyethylene is to be preferred.

The impregnating or filling liquid, as mentioned, is castor oil. Although its Q value is only fair, it is corona resistant at high frequency and has an extremely long life under ringing discharge conditions. Where higher Q is desired, a silicone oil such as dimethyl or methyl phenyl-silicone (linear polymers of alternating silicon and oxygen atoms, each silicon having two organic groups attached thereto) may be used. Dibutyl sebacate, monoisopropylbiphenyl or carbon tetrachloride may also be used. Carbon tetrachloride, however, presents a health hazard and is preferably to be avoided. Because of its low K value, as well as its inflammability and poor life at high stress, mineral oil is not useful. Dielectric gases such as Freon, nitrogen and sulphur-hydroxide represent further possibilities as the impregnant although at the present time a fluid or oil is the impregnant of choice.

Referring therefore to the several views:

FIGURE 1 is an external view of a finished capacitor constructed in accordance with the invention;

FIGURE 2 illustrates an assembly of capacitor elements embodying the invention shown in position to be wound about a center core or supporting arbor;

FIGURE 3 is a plan view of the capacitor assembly of FIGURE 2 fragmented to show details in the arrangement of the foil and dielectric layers; and FIGURE 4 is a view generally similar to FIGURE 2 and illustrating a preferred dielectric complex and foil assembly for a capacitor.

As shown in FIGURE 2, a capacitor in accordance with the present invention will comprise spaced layers 12 and 14 of electrically conductive metal foil such as aluminum, copper, lead or tantalum, spaced by a multiple-layer dielectric or insulating spacer 16 which in the form illustrated by FIGURE 2 comprises two layers of reconstituted mica interleaved with a single layer of irradiated polyethylene, the layers of reconstituted mica being adjacent to the foil layers 12 and 14 and separating them from the solid film of irradiated polyethylene. Conveniently the assembly will comprise a top layer 16 of irradiated polyethylene, a sublayer 18 of porous reconstituted mica, a layer 12 of electrically conducting metal foil, a further layer 20 of porous reconstituted mica immediately below the foil layer, next a layer 22 of irradiated polyethylene, then a layer of reconstituted mica 24, then the second layer 14 of electrically conductive metal foil and a bottom layer of porous reconstituted mica 26. The thus assembled sandwich is wound on a round, true-cylinder shaped permanent arbor preferably of a plastic material such as epoxy resin 28, and placed within a metal case 30. The resultant roll or assembly will thus comprise a pair of foils 14 and 12, one representing the high potential armature and the other the low potential armature which, although of wide area, are confined in a relatively small volume and are separated by a dielectric complex wherein porous webbings of reconstituted mica are immediately adjacent the foil and support an intermediate solid thickness or film of irradiated polyethylene.

Preferably, the winding will contain several series sections, and for which reason, as in FIGURE 3, the layers 12 and 14 of metal foil actually comprise two strips of unequal width and separated from each other by a space equal to 10 to 500 times the total dielectric thickness between the overlapping foil layers 12 and 14. Thus foil layer 14 comprises strips 14a and 14b, strip 14a having its outer margin 32 extending beyond the periphery of the interleaved layers of reconstituted mica and irradiated polyethylene. Similarly layer 12 of foil comprises strips 12a and 12b, strip 12a also having an outer marginal edge portion 34 extending beyond the interleaved dielectric spacer but to the opposite side of the assembly. Foil extensions 32 and 34 serve as convenient attachment areas by which the armature constituting foils may be electrically connected to the capacitor externally located terminals.

In the preferred construction illustrated by FIGURE 4, metal foils 12 and 14 which also constitute similarly arranged strips 12a, 12b and 14a, 14b, respectively, are separated by a dielectric complex which this time comprises two layers or thicknesses of irradiated polyethylene and three layers of reconstituted mica. Such an assembly conveniently will be arranged with a top layer 36 of irradiated polyethylene, a sublayer 30 of reconstituted mica, a layer of irradiated polyethylene 40, a layer of reconstituted mica 42, the first foil layer 12, a layer of reconstituted mica 44, a layer 46 of irradiated polyethylene, a layer 48 of reconstituted mica, a layer 50 of irradiated polyethylene, a layer 52 of reconstituted mica, a second layer 14 of metal foil, and a bottom layer 54 of reconstituted mica. The assembly is similarly wound about a cylindrical arbor 28 of epoxy resin and placed within cylindrical case 32 (FIGURE 1). It will be understood that although irradiated polyethylene is the dielectric material of choice to constitute solid film layers 16, 22 of FIGURE 3 and 36, 40, 46, 50 of FIGURE 4, other dielectric plastics such as the aforementioned Teflon or polypropylene may be used in place thereof or to constitute one or more of said layers. Although case 32 may be of any suitable material, preferably it is of brass or copper. Its interior also may be silverplated to raise the Q if necessary. The termination of thec apacitor is coaxial. As illustrated by FIGURE 1, the high potential terminal comprises a flat cylindrical block 56 centrally located on one end of the case and surrounded by an insulating wall 58. The low potential is terminated in a tapped ground ring or a bolt circle 60 around the high potential terminal and isolated therefrom by wall 58. Extensions 30 and 32 of foil pieces 12a and 14a are electrically connected to the respective terminals 56 and 58 by straps or the like, as is well known in the art. An optional charging terminal can be located on the opposite end of the case and connected to the high potential terminal through the arbor hole.

Before impregnation, the capacitor assemblies are vacuum dried to remove residual moisture and thereafter the impregnating material is introduced under pressure. The impregnating medium of choice is refined castor oil which has been carefully degassed and dried. However, any of the aforementioned impregnants, for example silicone oil, may be substituted. Preferably, one end of the case will be provided with a bellows or other expansion means which will keep from 20 to 30 pounds positive pressure on the impregnating oil at all times.

Advantageously, the hydrostatic pressure on the impregnating liquid will be in a range between 45 p.s.i.g. and 60 p.s.i.g. since increasing the pressure on the impregnating oil raises the corona threshold voltage in the capacitor, thereby permitting the dielectric to be stressed to a high potential as well as improving the life of the capacitor in terms of the number of possible discharge cycles at high voltages. For instance, a pressure of 60 p.s.i.g. on the dielectric liquid will raise the corona threshold voltage in the capacitor as much as 50% to 60% above that of the capacitor were its dielectric liquid under pressure of one atmosphere. Mechanical details of such a case are set forth in the copending application of E. A. Leach, filed concurrently herewith, and assigned to the same assignee.

Accelerated life tests have been conducted on capacitors employing dielectric complexes as illustrated by FIGURES 3 and 4 which had the following results:

A first group of six sample capacitors having a nominal capacitance of .12 mfd. and a voltage rating of 5 kv. were constructed where the complex dielectric comprised three layers of .0012 inch thick Samica and two layers of .002 inch thick layers of Irrathene (irradiated polyethylene). The foils were aluminum and the impregnant castor oil. Calculated stresses at the reference voltage on the Samica (impregnated) were 348 volts/mil and on the Irrathene 910 volts/mil.

A second group of six sample capacitors was also constructed having the same nominal capacitance voltage rating but this time the dielectric complex between the aluminum foils comprised two layers of .00075 inch thick Samica and one layer of .005 inch thick Irrathene (irradiated polyethylene). The impregnant again was castor oil. Calculated stress at the reference voltage of 5 kv. on the Samica (impregnated) was 344 volts/mil and on the Irrathene 900 volts/mil.

A third group of three sample capacitors having a nominal capacitance of .24 mfd. and a voltage rating of 3500 volts was also constructed. In these samples, the dielectric complex separating the aluminum foils comprised three layers of .00075 inch thick Samica and two layers of .0015 inch thick Irrathene. The impregnant was castor oil. Calculated stress at the reference voltage (3500 volts) was Samica (impregnated) 351 volts/mil and Irrathene 915 volts/mil.

In each instance the capacitor assemblies were sealed in a castor oil filled metal case into which was constructed a heater consisting of eight 270 ohm resistors and placed across the terminals (internally). The resistors were distributed throughout the case in approximately the same manner so that heat would be generated by the capacitor section and thermocouples attached. The resistor elements were then excited and a curve of case temperature rise versus watts dissipated was plotted on a graph and the resultant curve used to calculate Q of the capacitors by observing temperature rise versus current at various frequencies. The capacitors were excited by means of a power oscillator and the case temperature rise was observed for each setting of current and frequency. The watts loss corresponding to the observed temperature rise was derived from the graph and Q calculated as follows:

$$Q = \frac{1}{D.F.} = \frac{VARS}{Watts\ lost}$$

$$VARS = \frac{I^2}{2\pi f C}$$

Each of the samples were tested under the following conditions: Ringing frequency 200 kc. (reversal 90%). Each capacitor was charged to V volts, fired, immediately recharged and the cycle repeated. Each firing cycle is defined as one "shot" and the repetitive rate was one shot per second.

The results of the tests from Group I were as follows:

| Capacitor | Number of Shots at Each Voltage Level | | | |
|---|---|---|---|---|
| | 7K | 7.5K | 8K | 8.5K |
| 1 | 21,800 | 21,645 | 26,274 | 84,172 |
| 2 | 21,800 | 21,645 | 26,274 | 85,891 |
| 3 | 21,800 | 21,645 | 26,274 | 91,945 |
| 4 | 21,800 | 21,645 | 26,274 | [1] 7,079 |
| 5 | 21,800 | 21,645 | [1] 15,955 | |
| 6 | None | None | 10,279 | 86,229 |

[1] Failed at.

Q varied essentially linearly with frequency from a high Q of over 3,000 at 40 kc. to 2500 at 100 kc. to 400 at 400 kc.

The results of the tests for Group II were:

| Capacitor | Number of Shots at Each Voltage Level | | | |
|---|---|---|---|---|
| | 7.0K | 7.5K | 8.0K | 8.5K |
| 1 | 21,674 | 16,161 | 31,055 | [1] 8,635 |
| 2 | 21,674 | 16,161 | 31,055 | [1] 6,119 |
| 3 | 21,674 | 16,161 | 31,055 | [1] 4,400 |
| 4 | 21,674 | 16,161 | 31,055 | [1] 4,062 |
| 5 | 21,674 | 16,161 | [1] 13,265 | |
| 6 | None | None | [1] 15,136 | |

[1] Indicates failure shot.

Failure of capacitor #5 was found as due to damage from flattening the capacitor section. All other failures were due to corona off the foil edge, as evidenced by an expanded blackened area in the oil adjacent the foil edge due to carbonization. However, Q of these sample capacitors appeared slightly higher than in the first group. Thus Q at 500 kc. was measured at 475.

The results of the tests of the capacitors of Group III indicated no failures even after 1,649,977 shots at an operating level of 5,000 volts. Neither was there any appreciable temperature rise apparent. Analysis of the capacitors indicated no damaging effect of corona at the foil edge. Calculated stress at the test level for the Samica was 502 volts/mil and for the Irrathene 1310 volts/mil.

The first production capacitor made with a voltage rating of 60 kv., had a nominal capacitance of 0.235 mfd. and was tested as follows:

| Kv.: | Shots |
|---|---|
| 40 | 200 |
| 50 | 65,000 |
| 60 | 41,300 |
| 65 | 118,000 |
| 67.5 | 115,000 |
| 70 | 128,000 |
| 72 | 40,000 |
| 75 | 74,400 |
| 80 | 20 |
| Total | 581,920 |

The measured Q of this capacitor was 620 under full power operation at 100 kc.

Another capacitor selected at random from a production lot of 60 kv., 0.333 mfd. nominal, capacitors was tested as follows:

| Kv.: | Shots |
|---|---|
| 45 | 10,000 |
| 60 | 20,000 |
| 70 | 250,000 | without failure and with no evidence of degradation. The measured Q of this capacitor was in excess of 650.

It is thus apparent that all of the objects, advantages and features recited for the invention have been demonstrated as obtainable in a capacitor of the roll type in which the dielectric demonstrates superior thermal as well as chemical stability over long life when operated at high voltage high ringing discharge frequencies.

Having described the invention, we claim:

1. An electric capacitor having high Q and long life at high A.C. voltage operating levels and discharge frequencies comprising at least a pair of metal foil armatures, an interposed dielectric spacer therebetween including at least one sheet of polyethylene and a layer of highly porous reconstituted mica overlying each of the two sides of the polyethylene and substantially coextensive therewith, said assembly being impregnated with castor oil, said webbing of reconstituted mica accommodating thorough impregnation by the castor oil to fill all voids in the assembly and holding the castor oil at the foil and film surfaces, said capacitor having good corona resistance, high Q, and high voltage strength.

2. An electric capacitor having high Q and long life at high A.C. voltage operating levels and discharge frequencies comprising at least a pair of metal foil armatures, an interposed dielectric spacer therebetween including at least one sheet of solid dielectric material selected from the group consisting of irradiated polyethylene, polyethylene, polypropylene, and polytetrafluoroethylene and a layer of highly porous reconstituted mica overlying each of the two sides of solid dielectric sheet material and substantially coextensive therewith, said assembly being impregnated with castor oil, said webbing of reconstituted mica accommodating thorough impregnation by the castor oil to fill all voids in the assembly and holding the castor oil at the foil and film surfaces, said capacitor having good corona resistance, high Q, and high voltage strength.

(References on following page)

References Cited by the Examiner

UNITED STATES PATENTS 2,948,838  8/1960  Obenhaus _____ 317—260 X
3,016,481  1/1962  Simpson _____ 317—258

FOREIGN PATENTS 1,172,425  10/1958  France.
  679,330  10/1952  Great Britain.

OTHER REFERENCES

Dummer and Nordenberg, "Fixed and Variable Capacitor," McGraw-Hill, New York (1960), pp. 91, 145, 147, 152 relied on.  QC 587D8F.

LEWIS H. MYERS, *Primary Examiner.*
JOHN F. BURNS, ROBERT K. SCHAEFER,
*Examiners.*

E. GOLDBERG, *Assistant Examiner.*